United States Patent [19]
Martina

[11] 3,799,631
[45] Mar. 26, 1974

[54] SHIELDED BEARING CONSTRUCTION
[75] Inventor: Jack A. Martina, Fresno, Calif.
[73] Assignee: Weather Tec Corp., Fresno, Calif.
[22] Filed: Feb. 21, 1973
[21] Appl. No.: 334,229

[52] U.S. Cl............................. 308/36.1, 239/230
[51] Int. Cl. .......................................... F16c 33/74
[58] Field of Search .......... 308/36.1; 239/230, 201, 239/206, 200, 264, DIG. 4

[56] References Cited
UNITED STATES PATENTS

| | | | |
|---|---|---|---|
| 2,904,261 | 9/1959 | Johnson | 239/230 |
| 3,204,874 | 9/1965 | Senninger | 239/230 |
| 2,310,796 | 2/1943 | Lappin | 239/230 |
| 3,084,869 | 4/1963 | Hutty et al. | 239/201 |
| 3,343,796 | 9/1967 | Trickey | 239/201 |

FOREIGN PATENTS OR APPLICATIONS

| | | | |
|---|---|---|---|
| 1,288,921 | 2/1962 | France | 308/36.1 |

*Primary Examiner*—Charles J. Myhre
*Assistant Examiner*—Barry Grossman
*Attorney, Agent, or Firm*—Miketta, Glenny, Poms & Smith

[57] ABSTRACT

A bearing assembly particularly for a rotatable head in a sprinkler system, in which the bearing assembly is encased or shielded, so that impurities such as dirt and the like in the water flow or from the outside are prevented from reaching the mutually rotatable parts. The assembly comprises an upstanding sleeve bearing, typically made of brass and having an inner downwardly directed annular shoulder, against which an annular bearing seal is mounted and held in position by frictional contact with the wall of the bearing; a tubular metal spindle rotatably mounted within the bearing in clearance fit with the bearing and the seal, and provided at its lower end with a flange on which an annular washer is mounted, also in clearance fit with the bearing; and, at the lower end of the bearing, an annular retainer cap of a material having at least slight resilience, and including an upwardly extending skirt in interference frictional fit with the lower inner diameter of the sleeve bearing, whereby to rotatably support the spindle flange and permit the spindle a slight vertical play within the bearing. The cap also includes an upwardly projecting tubular extension within the spindle, terminating downwardly in an outwardly flared portion constituting in effect a funnel for guiding incoming water upwardly through the spindle, inwardly of the bearing seal and spindle washer.

6 Claims, 4 Drawing Figures

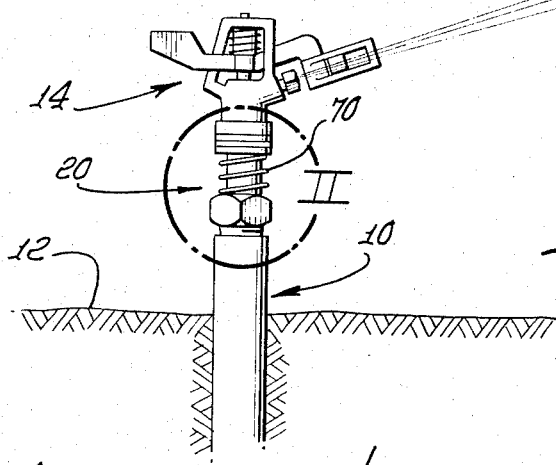
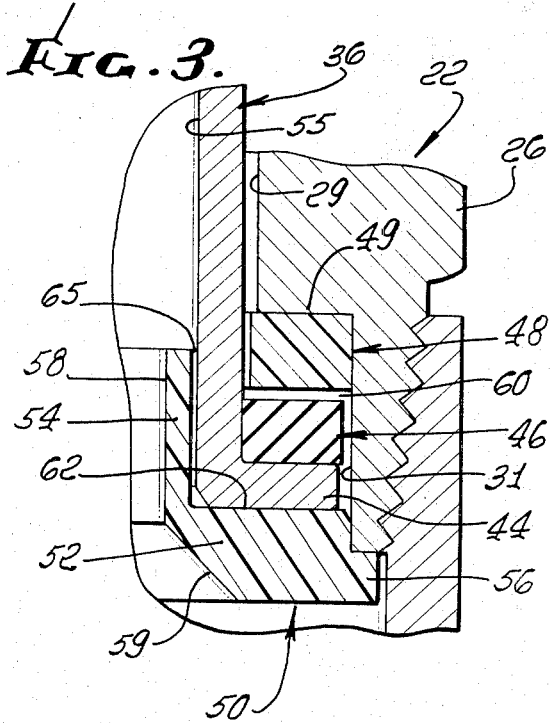

SHIELDED BEARING CONSTRUCTION

BACKGROUND AND FIELD OF THE INVENTION

Sprinkling systems employing one or more rotatable sprinkler heads are subject to mulfunction if dirt or other foreign particles become lodged between the mutually movable parts, particularly the seals and washers which are employed to prevent leakage during operation. Such foreign particles may enter the bearing assembly if a sprinkler head is accidentally dropped on the ground, or the foreign particles may be present in the water source, and thus carried by the water flow into the bearing assembly.

In accordance with the present invention, the relatively movable elements are encased so that they are shielded from the flow of water. The invention contemplates the provision of a sleeve bearing for threaded attachment to a riser, and a tubular spindle rotatably mounted within the sleeve bearing adapted to carry the sprinkler head at its upper end. The spindle is provided at its lower end with a flange, and an annular washer is carried on the flange, in mutually rotatable relation with an annular bearing seal mounted within the sleeve bearing proper. These parts are held in assembled relation by an annular retainer cap having an upwardly extending annular skirt in frictional interference fit with the inside diameter of the sleeve bearing, the upper face of the skirt serving to support the spindle flange and permitting at least slight vertical play of the spindle within the sleeve bearing. The parts are so shaped and arranged, as will be later understood, that the relatively movable parts are protected against the entrance of dirt even if the device may accidentally be dropped on the ground during handling.

Accordingly, the principal object of the invention is to provide a novel shielded bearing assembly particularly for supporting a rotatable sprinkler head. Other objects and purposes are to provide, for such a head, a bearing assembly comprising an outer sleeve bearing adapted to be threadedly engaged with the upper end of a riser connected to a source of water under pressure, and a tubular spindle within the sleeve bearing and in clearance fit relation with the inside diameter thereof; to provide in such an assembly an annular bearing seal carried by the sleeve bearing, and an annular spindle washer mounted upon an outwardly extending flange at the lower end of the spindle; to provide in such an assembly an annular retainer cap detachably attachable to the lower end of the sleeve bearing, for supporting the spindle and washer during assembly, and provided with an internal tubular extension for conducting water upwardly through the spindle; and for other objects and purposes as will become clear from the following description of an illustrative embodiment of the invention, taken in connection with the accompanying drawing in which:

BRIEF DESCRIPTION OF THE DRAWING

FIG. 1 is a side elevational view of a sprinkler head mounted upon a bearing assembly in accordance with the present invention which in turn is mounted upon the upper end of a water supply riser.

FIG. 2 is an enlarged vertical sectional view of the parts within the dotted circle II of FIG. 1.

FIG. 3 is a fragmentary sectional view, on an enlarged scale, of the lower right portion of the assembly of FIG. 2, as seen when the rotatable parts are in their lowermost position.

FIG. 4 is an exploded perspective view of the bearing assembly.

DETAILED DESCRIPTION

Referring now in detail to the drawing, there is shown in FIG. 1 a sprinkler installation including the bearing assembly of the present invention mounted upon a riser indicated generally at 10 projecting upwardly from grade 12 and connected in conventional manner to a source of water under pressure, not shown. The bearing assembly of the present invention serves to support a rotatable sprinkler head indicated generally at 14, of the impulse type. The bearing assembly of the present invention is indicated generally at 20, and will now be described in detail by reference to FIG. 2.

As appears in FIG. 2, the bearing assembly 20 includes an upstanding tubular sleeve bearing indicated generally at 22 having a lower externally threaded portion 23 which is threadedly engaged with internal threads 24 formed in the upper portion of riser 10. Above threads 23 sleeve bearing 22 includes a portion 26 having a hexagonal or other polygonal shape for engagement by a wrench, and extending thereabove is a tubular support portion 28 having a smooth cylindrical bore 29 extending therethrough, and terminating downwardly in an enlarged concentric cylindrical bore 31.

Rotatably mounted within sleeve bearing 22 is a tubular spindle indicated generally at 36 having an externally threaded upper portion 38 projecting above the upper end of sleeve bearing 22 for threaded engagement with the lower portion 39 of sprinkler head 14. The major portion of the length of tubular spindle 36 has an outer cylindrical surface 42, which is in clearance fit with the inner bore 29 of sleeve bearing 22. At its lowermost end, spindle 36 is provided with an outwardly projecting circumferential flange 44, which is in clearance fit with the enlarged bore 31 at the lower end of sleeve bearing 22.

A spindle washer indicated generally at 46 is supported on the upper annular face of the spindle flange 44. Above washer 46 is an annular bearing seal indicated generally at 48, which is in frictional fit within enlarged inner bore 31 of the bearing seal 22, and abuts upwardly against annular shoulder 49 of sleeve bearing 22, formed at the juncture of the tubular bore 29 and the enlarged bore 31.

Annular means detachably attachable to the lower end of sleeve bearing 22 are provided for supporting tubular spindle 36 in its position seen in FIG. 2. In the present form of the invention, such means take the form of a retainer cap indicated generally at 50, desirably made of a somewhat deformable material such as a suitable plastic. Retainer cap 50 includes a cylindrical body portion 52 which is in interference frictional fit with the inside diameter 31 of the lower portion of sleeve bearing 22. Above the cylindrical body portion 52, cap 50 includes a tubular portion 54 extending upwardly within the interior of tubular spindle 36, and in clearance fit with the inner cylindrical wall 55 of the spindle. Downwardly of cylindrical body 52 of retainer cap 50 is an enlarged annular shoulder portion 56, whose upper edge abuts against the lower annular edge of sleeve bearing 22 when the parts are in their assembled relation shown in FIGS. 2 and 3 of the drawing.

Retainer cap 50 is provided with an inner bore 58, which desirably in its lower portion diverges outwardly in a frusto-conical portion 59, thereby forming an inverted funnel to facilitate the upward passage of water through the retainer cap and thence through tubular spindle 36.

The exact preferred relationship of the parts and their clearances will be more clearly understood by reference to FIG. 3, showing the rotatable spindle 36 and spindle washer 46 in their lower positions. There is an annular clearance 60 between the washer 46 and seal 48, and spindle flange 44 rests upon the annular upper face 62 of retainer cap 50. The inside diameter of spindle washer 46 is in snug frictional fit upon spindle 36, and its outside diameter is spaced slightly inwardly from the enlarged bore 31 of sleeve bearing 22. Similarly, bearing seal 48 is in snug frictional fit within bore 31 and abuts shoulder 49 of the sleeve bearing, and its inside diameter is slightly outwardly spaced from the outside diameter of spindle 36. The outside diameter of tubular portion 54 of cap 50 is spaced radially inwardly slightly from the inside diameter 55 of spindle 36 by a clearance 65. The several radial clearances, and particularly clearance 65, are small, desirably of the order of 5 mils.

In a fully assembled sprinkler head as seen in FIG. 1, the rotatable parts are urged upwardly, both by the force of the upwardly moving water against the sprinkler head, and by resilient means such as compression spring 70 biasing the head 14 upwardly relative to bearing sleeve 22. This brings the facing annular surfaces of washer 46 and seal 48 into mutually rotatable slidable contact, thus closing the clearance 60 and creating a corresponding clearance between the lower face of spindle flange 44 and the annular face 62 of the retainer cap. This latter clearance, however, does not substantially impair the shielding characteristics of the present invention, since dirt particles are prevented from entering the bearing assembly by reason of the relatively long and narrow path represented by clearance 65 between the retainer cap and the spindle. The vertical play of the parts, represented by clearance 60, is desirably of the order of 20 mils or less.

It will accordingly be seen that the mutually rotatable surfaces are, in effect, shielded or encased by reason of the construction of the retainer cap 50 and sleeve bearing 22, and are thus protected against dirt from the outside of the structure. Furthermore, the upper tubular extension 54 of retainer cap 50 serves to guide or divert the upwardly flowing water within tubular spindle 36, so that small pieces of dirt or other impurities in the water, which might otherwise cause the rotatability of the parts to malfunction, are carried beyond the point where they would be likely to enter into the lower cavity of sleeve bearing 22 housing the parts of the bearing assembly heretofore described. The frusto-conical lower portion 59 of the passage way through retainer cap 50 may be advantageous during flow of the water in minimizing turbulence of the flow as it passes from the relatively larger inside diameter of the riser 10 into the smaller inside diameter of the tubular spindle 36. Since the retainer cap 50 is frictionally held in a slight interference fit within the lower portion of sleeve bearing 22, the cap may be easily removed for repair or maintenance and replacement of the bearing seal or the spindle washer as may become necessary after a long period of use.

It will accordingly be seen that there is provided in accordance with the present invention an inexpensive bearing assembly for use in liquid lines, wherein the mutually rotatable parts are effectively shielded from dirt from the outside. Changes and modifications from the referred form of the invention hereinabove described and illustrated are within the contemplation of the invention, and are intended to be embraced within the scope of the accompanying claims.

I claim:

1. A shielded bearing assembly comprising:
   an upstanding sleeve bearing adapted to be attached to the upper end of a riser pipe connected to a water supply, and provided with an upper elongated support bore and a lower concentric enlarged bore bounded upwardly by an annular shoulder;
   an annular bearing seal in abutting relation with said shoulder and in frictional fit with said enlarged bore;
   a tubular spindle rotatably mounted within said sleeve bearing in clearance fit relationship with the support bore and seal, the lower end of the spindle being provided with an outwardly extending annular flange in clearance fit relation with said enlarged bore;
   an annular washer mounted on said flange and in frictional fit with the spindle and clearance fit with said enlarged bore;
   and an annular retainer detachably attached to the lower end of said sleeve bearing and provided with an upwardly projecting tubular extension in clearance fit within said tubular spindle.

2. The invention as defined in claim 1 wherein the last named clearance fit is of the order of 5 mils.

3. The invention as defined in claim 2 wherein the tubular extension of the annular cap is provided with a cylindrical bore therein.

4. The invention as defined in claim 3 wherein the lower portion of the retainer cap has formed therein an outwardly flared frusto-conical portion concentric with the bore of the tubular extension and extending downwardly therefrom.

5. The invention as defined in claim 1 wherein said annular retainer cap has a cylindrical surface in interference fit within said enlarged bore.

6. The invention as defined in claim 5 wherein said annular retainer cap is further provided with a lower annular shoulder abuttable against the lower end of the sleeve bearing.

* * * * *